US00RE38791E

(19) United States
(12) Reissued Patent
Shibata et al.

(10) Patent Number: US RE38,791 E
(45) Date of Reissued Patent: Sep. 6, 2005

(54) SLIDING BEARING

(75) Inventors: Makoto Shibata, Toyota (JP); Masao Takahashi, Toyota (JP)

(73) Assignee: Taiho Kogyo Co., Ltd., Aichi (JP)

(21) Appl. No.: 10/207,958

(22) PCT Filed: Mar. 17, 1995

(86) PCT No.: PCT/JP95/00469

§ 371 (c)(1),
(2), (4) Date: Nov. 16, 1995

(87) PCT Pub. No.: WO95/25906

PCT Pub. Date: Sep. 28, 1995

Related U.S. Patent Documents

Reissue of:
(64) Patent No.: 5,700,547
Issued: Dec. 23, 1997
Appl. No.: 08/553,583
Filed: Nov. 16, 1995

(30) Foreign Application Priority Data

Mar. 18, 1994 (JP) ..... 6-073965

(51) Int. Cl.[7] ..... B32B 3/28; F16C 32/06
(52) U.S. Cl. ..... 428/167; 428/156; 428/212; 384/114; 384/115; 384/120
(58) Field of Search ..... 428/150, 167, 428/172, 141, 212; 384/114, 115, 295, 113, 276, 123, 912

(56) References Cited

U.S. PATENT DOCUMENTS

| | | | |
|---|---|---|---|
| 4,561,787 | A | 12/1985 | Ehrentraut et al. |
| 5,094,550 | A | 3/1992 | Momose et al. |
| 5,211,483 | A | 5/1993 | Blaurock |
| 5,238,311 | A | 8/1993 | Katou et al. |

FOREIGN PATENT DOCUMENTS

| | | |
|---|---|---|
| JP | U-63-30619 | 2/1988 |
| JP | B2-63-11530 | 3/1988 |
| JP | U-63-53922 | 4/1988 |
| JP | B2-2-36825 | 8/1990 |
| JP | A-4-54311 | 2/1992 |
| JP | Y2-4-39461 | 9/1992 |

OTHER PUBLICATIONS

Translation of Sep. 29, 1999 Decision in Japanese Opposition.

JIS Handbook 1989, Machine Elements.

Fig. No. W–31049, Oct. 1986 (and partial translation).

Bearing Wear and Countermeasure, p. 262, Mar., 1971 (and partial translation).

Grinding Process Technology Manual, "Lubrication of a Sliding Surface with Uniform Irregularities", Suenaga et al., 1970 (and partial translation).

*Primary Examiner*—Donald J. Loney
(74) *Attorney, Agent, or Firm*—Oliff & Berridge, PLC

(57) ABSTRACT

A helically continuous projection 1a is formed around a sliding surface 1A of a sliding bearing 1 at a given pitch p. The surface roughness h of the sliding surface 1A, including the projection 1a, is chosen to be equal to or less than one-half the height H of the projection. This provides a sliding bearing 1 which exhibits an improved running-in performance.

14 Claims, 3 Drawing Sheets

SLIDING BEARING

Matter enclosed in heavy brackets [ ] appears in the original patent but forms no part of this reissue specification; matter printed in italics indicates the additions made by reissue.

TECHNICAL FIELD

The invention relates to a sliding bearing, and more particularly, to a sliding bearing having an annular projection formed on a sliding surface thereof.

BACKGROUND

A sliding bearing having an annular projection formed around its sliding surface is disclosed, for example, in Japanese Patent Publication No. 11,530/1988. However, in the disclosed sliding bearing, no consideration is paid to the relationship between the roughness of the sliding surface including the surface of the annular projection and the height of the annular projection.

DISCLOSURE OF THE INVENTION

The present inventor has found that running-in performance of the sliding surface of a sliding bearing can be improved by a suitable choice of the roughness of the sliding surface, including the surface of the annular projection, and the height of the annular projection. Specifically, in a sliding bearing having a plurality of annular projections formed to a given height around the sliding surface, in accordance with the invention, the roughness of the sliding surface, including the surface of the annular projections, is chosen to be equal to or less than one-half the height of the annular projections. With this arrangement, the running-in performance of the sliding bearing can be improved over the prior art, as will be demonstrated by results of experiments conducted, which will be described later.

BEST MODE FOR CARRYING OUT THE INVENTION

Figure 1:
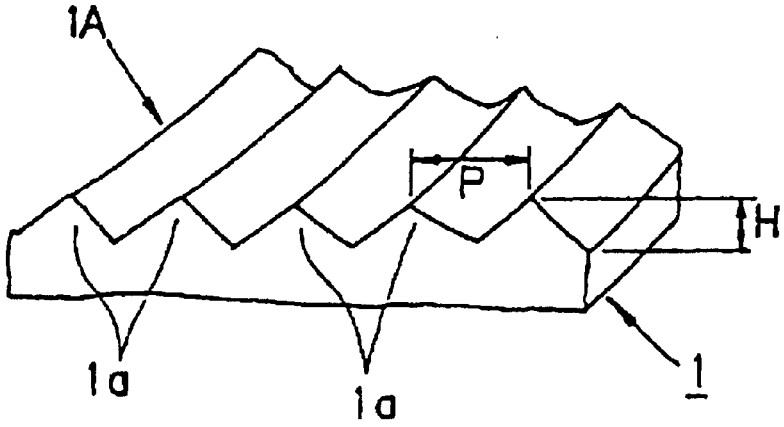
FIG. 1 is a perspective view of a sliding surface of a sliding bearing according to one embodiment of the invention.

The invention will now be described with reference to an embodiment shown in the drawings. FIG. 1 is a perspective view of a sliding surface 1A of a sliding bearing 1. In this embodiment, a projection 1a which continues in a helical form is formed at a given pitch p and to a height H around the sliding surface 1A.

Figure 2:
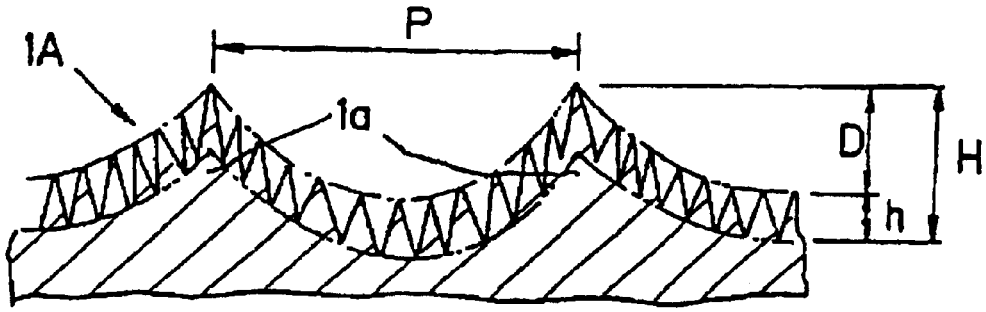
FIG. 2 is an enlarged view of part shown in FIG. 1.

As shown to an enlarged scale in FIG. 2, in this embodiment, the height H of the projection 1a is chosen in a range from 2 to 8 $\mu$m, and the pitch p is chosen in a range from 0.1 to 0.4 mm. Preferably, $h \leqq 0.25H+0.5$, while H ranges from 2 to 10 $\mu$m. More preferably, the height H is chosen in a range from 3 to 5 $\mu$m in favor of the load capacity. h shown in FIG. 2 represents a surface roughness over the entire sliding surface 1A.

In this embodiment, the surface roughness h over the entire sliding surface 1A, including the surface of the projection 1a, is chosen to be equal to or less than one-half the height H of the projection 1a. Thus, when a height H of 4 $\mu$m is chosen for the projection 1a, the surface roughness h over the entire sliding surface 1A is chosen to be equal to or less than 2 $\mu$m.

Figure 3:
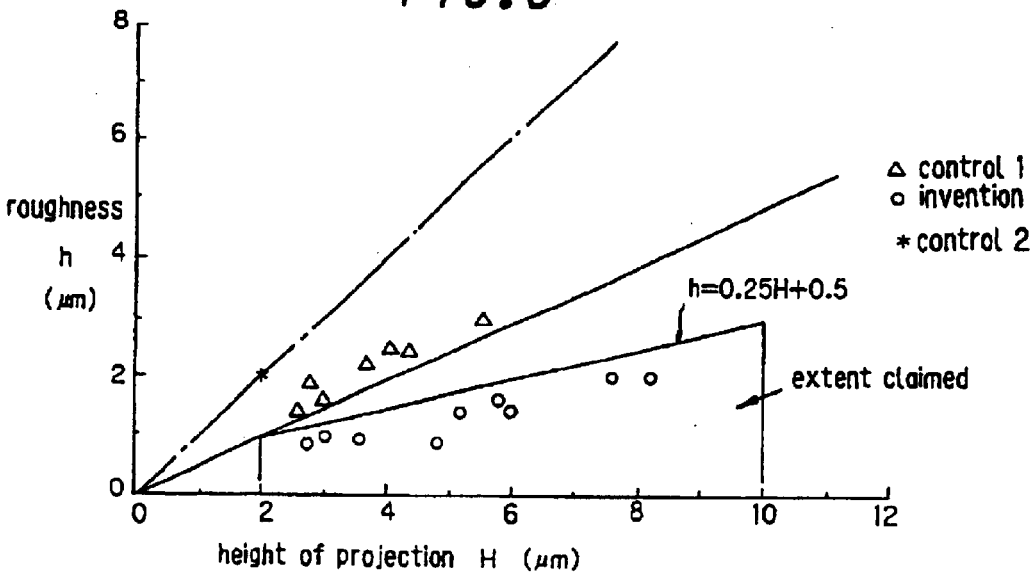
FIG. 3 graphically demonstrates differences in construction between a product according to the invention and controls 1 and 2.

In FIG. 3, the surface roughness h over the sliding surface 1A, taken on the ordinate, is plotted against the height H of the projection 1a, taken on the abscissa, in order to demonstrate differences in the construction between the product according to the invention and controls 1 and 2. An experiment to determine the running-in performance has been conducted for the sliding bearing 1 and the controls 1 and 2, exemplified in FIG. 3, and results are shown in FIGS. 4 and 5.

Figure 4:
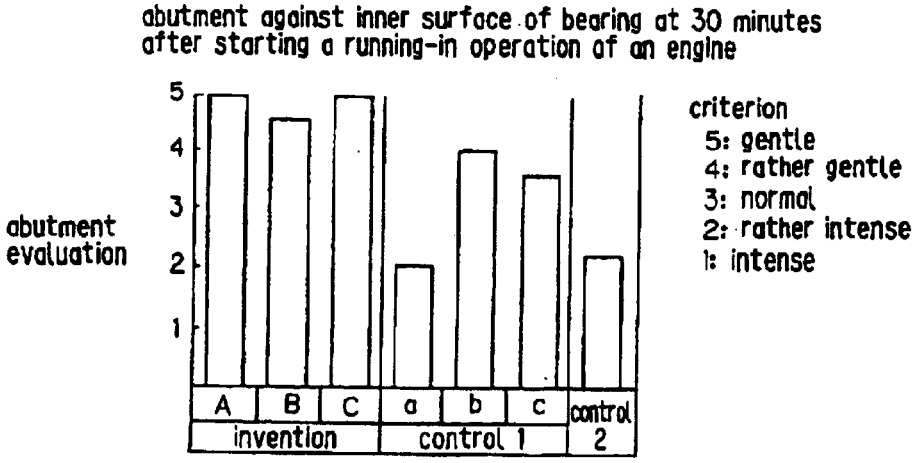
FIG. 4 is a chart indicating results of a test conducted concerning the running-in performance of the sliding bearing.

FIG. 4 indicates the evaluation of the abutment experienced by the inner surface of the sliding bearing when a crankshaft of an engine is journalled therein at 30 minutes after the start of operation. In FIG. 4, samples A, B and C are sliding bearings manufactured according to the invention, so that the surface roughness h is equal to or less than one-half times the height H of the projection 1a, and samples a, b and c are of the control 1, representing sliding bearings in which the surface roughness h of the sliding surface is greater than one-half the height H of the projection 1a. The control 2 represents a sliding bearing in which the sliding surface is finished flat by a conventional boring operation. In this instance, the height H, which is equivalent to the height of the projection 1a, is substantially on the same order as the surface roughness h or about 2 $\mu$m, and there is essentially no difference therebetween. As will be noted from FIG. 5, the remaining oil amount is reduced and has a large variation for the control 2. It will be seen from FIG. 4 that the samples A, B and C according to the invention provide better results than the controls 1 and 2 in respect of the abutment.

Figure 5:
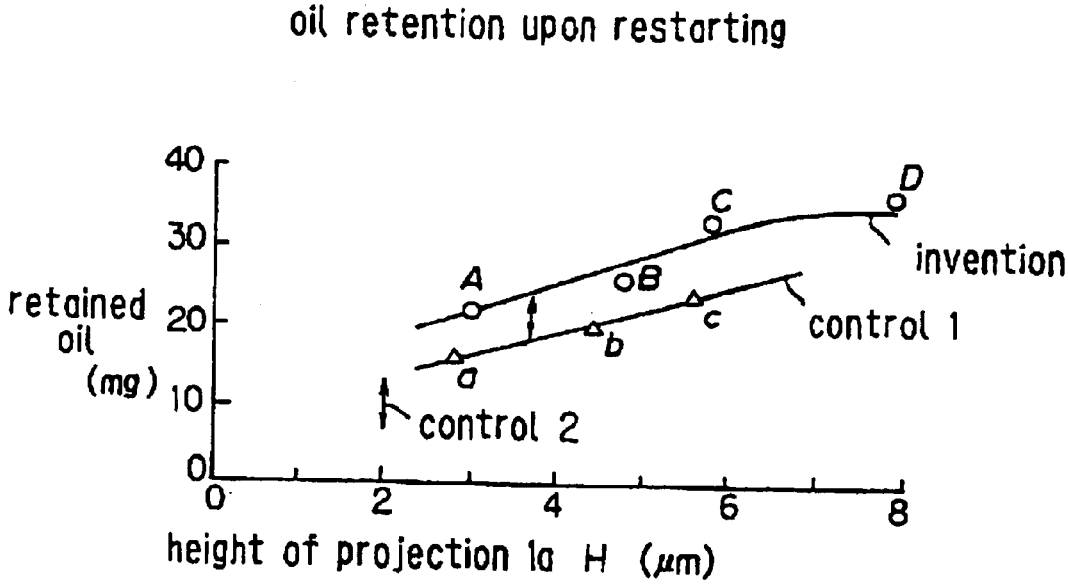
FIG. 5 graphically shows results of tests conducted to examine the running-in performance of the sliding bearing.

FIG. 5 shows results of experiments conducted to determine the amount of a lubricating oil which is retained by the sliding bearing when the engine is re-started. It will be seen from FIG. 5 that the retention of the lubricating oil of the samples A, B and C according to the invention is by 20 to 30% higher than that of the control 1. In addition, a variation in the amount of remaining oil is reduced in the samples according to the invention, and in these samples, such amount is on the order of twice that of the control 2. In this manner, the present embodiment provides an improved running-in performance of the sliding bearing 1.

In the embodiment described above, the projection 1a is formed so as to be continuous in a helical configuration, but a plurality of annular projections which are spaced apart axially at a given pitch may be used instead as well.

What is claimed is:

1. A sliding bearing having a plurality of annular projections formed to a given height around a sliding surface; characterized in that a surface roughness of the sliding surface, including the surface of the annular projections, is chosen to be equal to or less than one-half the height of the annular projections, *and in which the height of the projections is in a range from 2 to 10 $\mu$m, and the height of the projections in microns is denoted by H and the roughness in microns is denoted by h, these parameters being related by the following inequality:*

$$h \leqq 0.25H+0.5.$$

[2. A sliding bearing according to claim 1 in which the height of the projection in microns is denoted by H and the roughness in microns is denoted by h, these parameters being related by the following inequality:

$$h \leqq 0.25H+0.5.]$$

[3. A sliding bearing according to claim 1 in which the height of the projections is in a range from 2 to 10 μm.]

4. A sliding bearing [according to claim 1] *having a plurality of annular projections formed to a given height around a sliding surface; characterized in that a surface roughness of the sliding surface, including the surface of the annular projections, is chosen to be equal to or less than one-half the height of the annular projections, and* in which the height of the projections is in a range from 3 to 5 μm.

5. A sliding bearing according to claim 1 in which the pitch between axially adjacent projections is in a range from 0.1 to 0.4 mm.

*6. A sliding bearing according to claim 4, in which the pitch between axially adjacent projections is in a range from 0.1 to 0.4 mm.*

*7. A sliding bearing according to claim 1, in which the height of the projections is in a range from 3 to 5 μm.*

*8. A sliding bearing according to claim 7, in which the pitch between axially adjacent projections is in a range from 0.1 to 0.4 mm.*

*9. A sliding bearing having a plurality of annular projections formed to a given height around a sliding surface; characterized in that a surface roughness of the sliding surface, including the surface of the annular projections, is chosen to be equal to or less than one-half the height of the annular projections, and the height of the projections is in a range from 2 to 6 μm.*

*10. A sliding bearing according to claim 9, in which the height of the projection in microns is denoted by H and the roughness in microns is denoted by h, these parameters being related by the following inequality:*

$$h \leqq 0.25H+0.5.$$

*11. A sliding bearing according to claim 9, in which the pitch between axially adjacent projections is in a range from 0.1 to 0.4 mm.*

*12. A sliding bearing according to claim 10, in which the pitch between axially adjacent projections is in a range from 0.1 to 0.4 mm.*

*13. A sliding bearing having a plurality of annular projections formed to a given height around a sliding surface; characterized in that a surface roughness of the sliding surface, including the surface of the annular projections, is chosen to be equal to or less than one-half the height of the annular projections, and the height of the projections is in a range from 2 to 5 μm.*

*14. A sliding bearing according to claim 13, in which the height of the projection in microns is denoted by H and the roughness in microns is denoted by h, these parameters being related by the following inequality:*

$$h \leqq 0.25H+0.5.$$

*15. A sliding bearing according to claim 13, in which the pitch between axially adjacent projections is in a range from 0.1 to 0.4 mm.*

*16. A sliding bearing according to claim 14, in which the pitch between axially adjacent projections is in a range from 0.1 to 0.4 mm.*

* * * * *